UNITED STATES PATENT OFFICE.

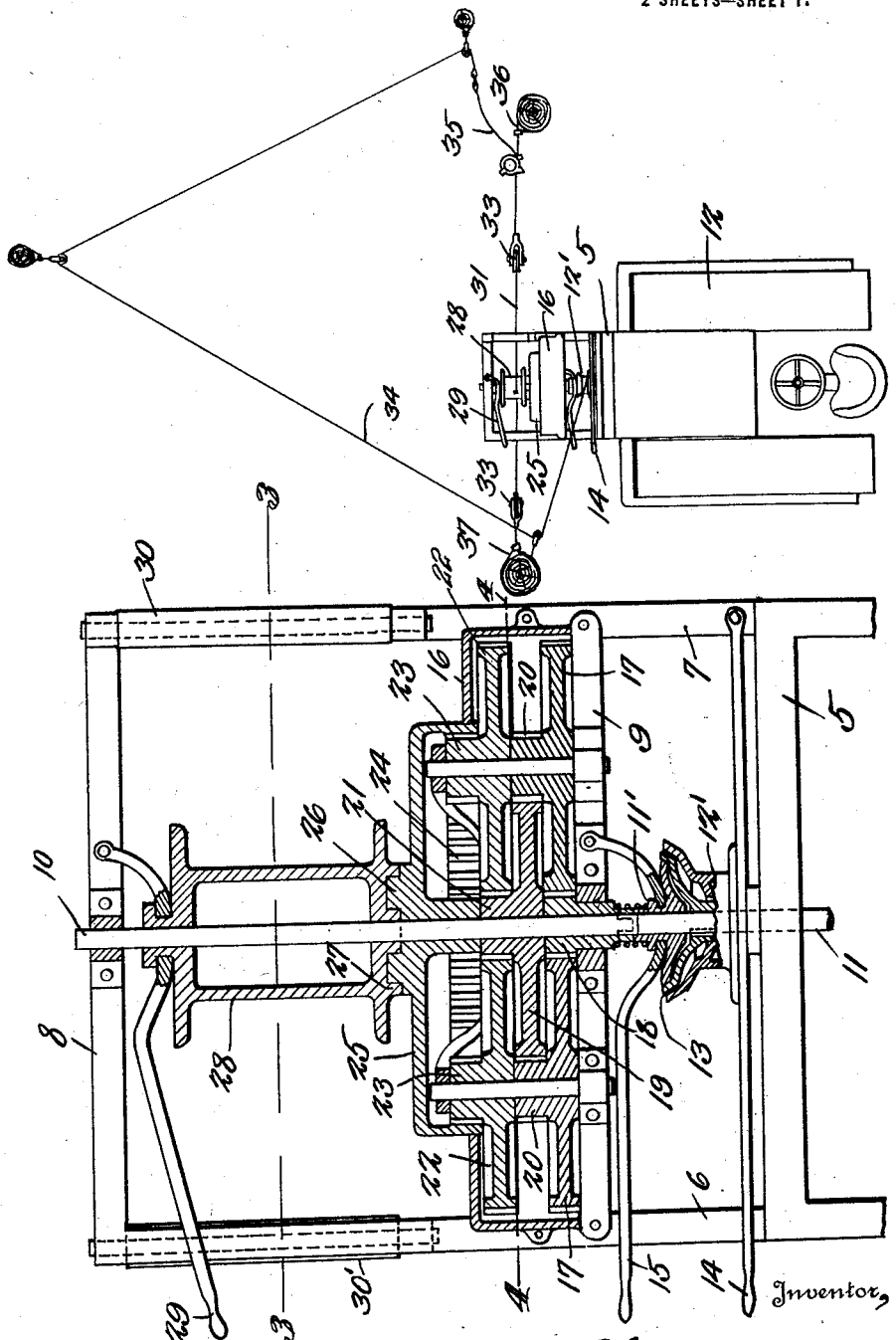

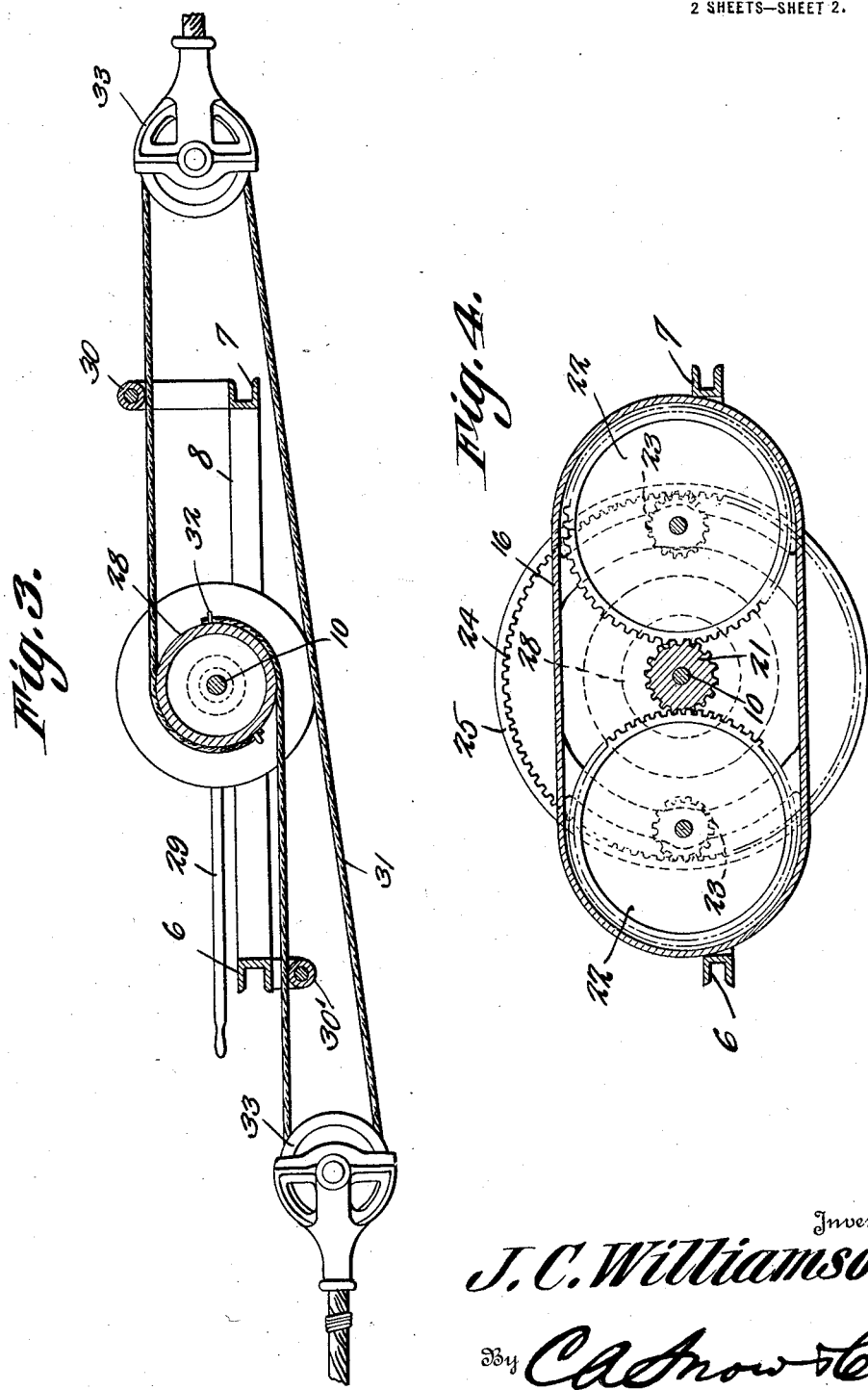

JAMES C. WILLIAMSON, OF CORDELE, GEORGIA.

SELF-ANCHORING STUMP EXTRACTOR.

1,406,317. Specification of Letters Patent. Patented Feb. 14, 1922.

Application filed March 7, 1921. Serial No. 450,200.

*To all whom it may concern:*

Be it known that I, JAMES C. WILLIAMSON, a citizen of the United States, residing at Cordele, in the county of Crisp and State of Georgia, have invented a new and useful Self-Anchoring Stump Extractor, of which the following is a specification.

This invention has reference to stump extracting machines, and more particularly to a machine employing a novel form of transmission especially adapted for operating the drum of the machine, whereby the speed of rotation of the power shaft is reduced to the required degree necessary for extracting stumps or the like from the soil, in which the same are supported.

The important object of the invention is to provide an arrangement of gears forming the support of the structure, whereby the machine may operate laterally of its work.

Another object of the invention is the provision of novel connecting means for connecting the power cable to the drum in a manner to equalize the strain directed to the drum and bearings during the extracting operation thereby reducing wear at these points to a minimum.

With the foregoing and other objects in view, it is to be understood that the present disclosure illustrates the preferred embodiment of the invention, and that suitable changes adapting the device for various usages, may be made within the scope of the appended claims.

Referring to the drawing:—

Figure 1 is a plan view of a machine constructed in accordance with the present invention.

Figure 2 is a plan view of the same, showing the power element of the machine, and illustrating the machine as set up ready for extracting a stump.

Figure 3 is an end elevational view disclosing the drum and pulleys associated therewith.

Figure 4 is a sectional view taken on line 4—4 of Figure 1.

Referring to the drawings in detail, the reference character 5 designates the forward portion of the frame of the usual tractor to which the auxiliary frame or frame which supports the stump pulling apparatus, forming the subject matter of this invention, is secured.

The auxiliary frame includes the side bars 6 and 7 respectively, and end bar 8, there being provided a bar 9 disposed adjacent to one end of the auxiliary frame for providing a support for the power shaft 10, which is mounted in suitable bearings secured to the bars 8 and 9.

The reference character 11 designates the drive shaft of the power device, which in the present instance is in the form of a tractor indicated at 12, and as shown, this drive shaft transmits power to the power shaft 10 of the machine, through a train of gears controlled by the clutch member 11', which may be of any suitable construction to permit the shaft 10 to be thrown into and out of operation at the will of the operator.

Loosely mounted on the shaft 11 is a drum 12' which may be clutched to the shaft 11 as by means of the friction or cone clutch 13 which is keyed to the shaft and controlled by the movement of the clutch lever 14 that operates on the drum moving the same longitudinally of the shaft 11, into and out of operation.

The clutch lever 15 has connection with the clutch member 11' and by means of this lever 15 the clutch member 11' is controlled to cause the operation of the train of gears. A supporting frame 16 is mounted between the side bars 6 and 7, the frame being in the form of a housing for housing the gearing which transmits motion from the shaft 11 to the drum 28, and by which the rate of speed of rotation of the shaft 11 is greatly reduced to adapt the device for stump extracting.

The gearing embodies opposed pinions 17 which mesh with the relatively small pinion 18 that is provided with a clutch face on one end thereof to be clutched with the opposed clutch 11' and which is mounted on the shaft 11 for receiving motion therefrom, the pinion 18 imparting rotary movement to the pinions 17, which in turn impart rotary movement to the pinion 19, through the integral pinions 20, carried by the pinions 17.

The pinion 19 also has an integral pinion 21 formed thereon, which meshes with the teeth of the pinions 22 that have integral pinions 23 and which mesh with the internal teeth 24 of the gear 25. Formed on the gear 25 is a clutch face 26 adapted to cooperate with the clutch face 27 formed on one end of the power drum 28, which is mounted on the shaft 10 and designed to move longitudinally thereof, there being provided an operating lever 29 having connection with the drum 28 for moving the drum to cause the clutch faces 26 and 27 to become interlocked to accomplish the rotation of the drum.

In order that the power device will be held against movement, when the power is applied, and thereby prevent any possibility of the machine turning over, a roller 30 is mounted on the side bar 7 and disposed in spaced relation therewith, the cable 31 operating over the under surface of the roller. The roller 30' carried by the side bar 6, depends from the under surface thereof and provides a support for the cable 31 which operates over the upper surface thereof.

From the foregoing it will be seen that as power is applied to the machine, any twisting movement of the machine will be prevented by the contact of the cable 31 with the rollers 30 and 30'.

In carrying out the invention, the main cable 31 has its ends secured to the power drum 28 as at 32, the ends having connection with the drum at points adjacent to one end thereof, so that when the cable is wound on the drum, the portions of the cable being wound on the drum will direct strain to the drum at one point thereon. The intermediate portion of the cable 31 passes over the pulleys 33 which are disposed on opposite sides of the machine. Thus it will be seen that as the drum 28 is rotated, the cable 31 is wound thereon at both of its ends, thereby equalizing the strain on the drum, to the extent that the drum or its supporting shaft receives the minimum amount of strain.

The drum 12' provides the support for the cable 34, or rehaul cable which has connection with the cable 35 used in stump pulling, and which cable 34 is employed for rehauling the power cable from the drum 28 after the pulling of a stump.

In the operation of the device, a loop 36 is positioned around a stump, while the opposed loop 37 is positioned around another stump. Power is now applied to the drum in a manner as previously described, with the result that the weaker of the two stumps will be extracted.

After a stump has been pulled, the rehaul line 34 is wound on the drum 12', with the result that the loops 36 and 37 are now in positions to be again employed in the stump pulling operation.

It is to be understood however that the pull cable or the various cables of the machine may be of any desired length, the lengths being determined by the radius in which the device is to be worked.

Having thus described the invention, what is claimed as new is:—

1. In a device of the character described, a frame, a shaft on the frame, a drum on the shaft, a roller disposed above the frame, and secured to one of the side bars thereof, a roller secured to the frame and depending from the opposite side bar of the frame, a power cable having connection with the drum and operating over the rollers, and means for imparting rotary movement to the drum.

2. A stump puller including a tractor having a drive shaft, a frame supported at the forward end of the tractor, a shaft supported by the frame, a drum on the latter shaft, said drum having one end disposed towards the front end of the tractor, a power cable having its ends connected to the drum, said drum being positioned to move the cable laterally of the frame, and means contacting with the cable for preventing movement of the frame in a vertical plane.

In testimony that I claim the foregoing as my own, I have hereto affixed my signature in the presence of two witnesses.

JAMES C. WILLIAMSON.

Witnesses:
 Ivy E. Simpson,
 Agnes Rockelli.